(12) United States Patent
Lai et al.

(10) Patent No.: US 11,762,827 B2
(45) Date of Patent: Sep. 19, 2023

(54) B-PLUS TREE ACCESS METHOD AND APPARATUS, AND COMPUTER-READABLE STORAGE MEDIUM

(71) Applicant: Inspur Suzhou Intelligent Technology Co., Ltd., Suzhou (CN)

(72) Inventors: Weiguo Lai, Suzhou (CN); Zhiyong Liu, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 17/799,878

(22) PCT Filed: Sep. 24, 2020

(86) PCT No.: PCT/CN2020/117331
§ 371 (c)(1),
(2) Date: Aug. 15, 2022

(87) PCT Pub. No.: WO2021/159711
PCT Pub. Date: Aug. 19, 2021

(65) Prior Publication Data
US 2023/0078081 A1    Mar. 16, 2023

(30) Foreign Application Priority Data
Feb. 14, 2020 (CN) .......................... 202010093601.7

(51) Int. Cl.
*G06F 16/22* (2019.01)
(52) U.S. Cl.
CPC ................ *G06F 16/2246* (2019.01)
(58) Field of Classification Search
CPC ..... G06F 16/13; G06F 16/185; G06F 16/2246
See application file for complete search history.

(56) References Cited

U.S. PATENT DOCUMENTS 5,813,000 A * 9/1998 Furlani ............... G06F 16/9027
11,086,524 B1 * 8/2021 Sun ....................... G06F 3/0604
(Continued)

FOREIGN PATENT DOCUMENTS

CN    1801769 A    7/2006
CN  101789028 A    7/2010
(Continued)

OTHER PUBLICATIONS

International Search Report and Written Opinion of corresponding PCT application (PCT/CN2020/117331) dated Dec. 21, 2020 including English translation (14 pages).
(Continued)

*Primary Examiner* — James E Richardson
(74) *Attorney, Agent, or Firm* — Crowell & Moring LLP

(57) ABSTRACT

A B+ tree access method, apparatus, and a medium include: when a B+ tree creation instruction is acquired, determining whether there is an idle underlying tree file mapped to a Dynamic Random Access Memory (DRAM); if YES, storing underlying data of a B+ tree in the underlying tree file; if NO, creating a new target underlying tree file, and mapping the target underlying tree file to the DRAM, so as to store the underlying data of the B+ tree in the target underlying tree file; and when a number of layers of the B+ tree is greater than or equal to a preset threshold, storing, in a preset storage area, data of a layer numbered to be greater than or equal to the preset threshold in the B+ tree. Based on a data structure of the B+ tree, data needs to be accessed from the underlying data whenever read.

20 Claims, 3 Drawing Sheets

(56) References Cited

U.S. PATENT DOCUMENTS

| | | | |
|---|---|---|---|
| 2010/0235335 A1* | 9/2010 | Hernan | G06F 16/2246 |
| | | | 707/703 |
| 2015/0089185 A1 | 3/2015 | Brandyberry et al. | |
| 2015/0106578 A1 | 4/2015 | Warfield et al. | |
| 2016/0026652 A1* | 1/2016 | Zheng | G06F 16/137 |
| | | | 707/692 |
| 2017/0046352 A1 | 2/2017 | Lord | |
| 2017/0118041 A1* | 4/2017 | Bhattacharya | H04L 41/0895 |
| 2017/0300388 A1* | 10/2017 | Zheng | G06F 11/1464 |
| 2018/0307425 A1 | 10/2018 | Blount | |
| 2020/0042637 A1* | 2/2020 | Wu | G06F 16/319 |

FOREIGN PATENT DOCUMENTS

| | | | | |
|---|---|---|---|---|
| CN | 104899297 A | | 9/2015 | |
| CN | 105930280 A | | 9/2016 | |
| CN | 107852378 A | | 3/2018 | |
| CN | 108733678 A | | 11/2018 | |
| CN | 108804019 A | | 11/2018 | |
| CN | 109284299 A | | 1/2019 | |
| CN | 109376156 A | | 2/2019 | |
| CN | 109407978 A | | 3/2019 | |
| CN | 109407979 A | * | 3/2019 | G06F 12/0246 |
| CN | 109766312 A | | 5/2019 | |
| CN | 110147204 A | | 8/2019 | |
| CN | 110597805 A | | 12/2019 | |
| CN | 110688345 A | | 1/2020 | |
| CN | 111309258 A | | 6/2020 | |
| JP | 2001350635 A | | 12/2001 | |

OTHER PUBLICATIONS

Notification to Grant Patent Right for Invention for CN priority application (CN202010093601.7) dated Sep. 15, 2021 including English translation (3 pages).

First Office Action of corresponding CN priority application (CN202010093601.7) dated Mar. 3, 2021, including English translation (10 pages).

Search report of corresponding CN priority application (CN202010093601.7) dated Feb. 23, 2021, including English translation (3 page).

Supplementary search report of corresponding CN priority application (CN202010093601.7) dated Sep. 2, 2021, including English translation (4 pages).

* cited by examiner

B-PLUS TREE ACCESS METHOD AND APPARATUS, AND COMPUTER-READABLE STORAGE MEDIUM

This application is the national phase application of International Application No. PCT/CN2020/117331, filed Sep. 24, 2020, which claims priority to Chinese Patent Application No. 202010093601.7, filed on Feb. 14, 2020, in China National Intellectual Property Administration and entitled "B+ Tree Access Method and Apparatus, and Computer-Readable Storage Medium", the contents of each of which are hereby incorporated by reference in [its] their entirety.

FIELD

The present disclosure relates to the technical field of data storage, and particularly to a B+ tree access method and apparatus, and a computer-readable storage medium.

BACKGROUND

A plenty of B+ tree structures are used in an all-flash array storage system because of a special structure thereof. For example, an all-flash array generally uses thin provisioning, and a logical address of a volume is in no longer linear correspondence but approximately random mapping with a physical address of the volume on a Redundant Array of Independent Disks (RAID). In order to manage such mapping relationships, B+ trees are used to store mappings from logical addresses to physical addresses of volumes and inverse mappings from the physical address to the logical address. For a de-duplication function of the all-flash array, B+ trees are used to store mappings from HASH values of data blocks to physical addresses.

A Dynamic Random Access Memory (DRAM) is a relatively common system memory. Since the DRAM is a relatively expensive component, only a relatively small number of DRAMs are configured in a storage system to reduce the cost. In the prior art, data of a B+ tree is usually stored in a Solid State Drive (SSD). Data in the SSD needs to be read into the memory first and then read/written, while an Input/Output (TO) path for reading/writing the SSD is relatively long, so the speed is low. Frequently reading a B+ tree structure into the memory and swapping the B+ tree structure out of the memory may bring a high Central Processing Unit (CPU) overhead.

Therefore, how to improve the B+ tree read/write efficiency is a problem that needs to be solved by those skilled in the art.

SUMMARY

An objective of embodiments of the present disclosure is to provide a B+ tree access method and apparatus, and a computer-readable storage medium, thereby improving the B+ tree read/write efficiency.

In order to solve the foregoing technical problem, the embodiments of the present disclosure provide a B+ tree access method, including:

under a circumstance that a B+ tree creation instruction is acquired, determining whether there is an idle underlying tree file mapped to a DRAM;

in response to there being the idle underlying tree file mapped to the DRAM, storing underlying data of a B+ tree in the underlying tree file;

in response to there being no idle underlying tree file mapped to the DRAM, creating a new target underlying tree file, and mapping the target underlying tree file to the DRAM, so as to store the underlying data of the B+ tree in the target underlying tree file; and in response to a number of layers of the B+ tree being greater than or equal to a preset threshold, storing, in a preset storage area, data of a layer numbered to be greater than or equal to the preset threshold in the B+ tree.

In an embodiment, the B+ tree correspondingly includes a first layer, a second layer, and a third layer, and data of the first layer is determined as the underlying data;

Correspondingly, in response to the number of layers of the B+ tree being greater than or equal to the preset threshold, storing, in a preset storage area, data of a layer numbered to be greater than or equal to the preset threshold in the B+ tree includes:

storing data of the second layer of the B+ tree in a Data Center Persistent Memory Module (DCPMM); and storing data of the third layer of the B+ tree in a preset hard disk.

In a further embodiment, before the B+ tree creation instruction is acquired, determining whether there is an idle underlying tree file mapped to a DRAM, the method further includes:

determining a minimum read/write granularity of the DCPMM as a node capacity of the B+ tree.

In a further embodiment, the step of storing underlying data of the B+ tree in the underlying tree file includes:

storing the underlying data of the B+ tree in the underlying tree file as each piece of node data according to the node capacity, wherein an offset address of a node of a next layer is stored in a key-value pair of the each piece of node data.

In a further embodiment, the method further includes:

under a circumstance that a data query instruction is acquired, determining a root node according to a logical address contained in the data query instruction; and determining a leaf node according to an offset address in the root node, and reading data corresponding to the leaf node.

In a further embodiment, the method further includes:

under a circumstance that a data modification instruction is acquired, determining whether there is node data matched with a node identifier contained in the data modification instruction in the DRAM;

in response to there being the node data matched with the node identifier, modifying the node data according to surrogate data contained in the data modification instruction, and setting a dirty flag for modified node data;

in response to there being no node data matched with the node identifier, determining whether there is the node data matched with the node identifier contained in the data modification instruction in the DCPMM;

in response to there being the node data matched with the node identifier contained in the data modification instruction in the DCPMM, modifying the node data according to surrogate data contained in the data modification instruction;

in response to there being no node data matched with the node identifier contained in the data modification instruction in the DCPMM, reading the node data matched with the node identifier contained in the data modification instruction from the hard disk to the DRAM; and completing, in the DRAM, modification of the node data according to surrogate data contained in the data modification instruction, and setting the dirty flag for modified node data.

In a further embodiment, after storing underlying data of the B+ tree in the underlying tree file, the method further includes:

migrating data mapped to the DRAM and set with the dirty flag to the DCPMM according to preset periodic time.

The embodiments of the present disclosure also provide a B+ tree access apparatus, including a first judgment unit, a first storage unit, a creation unit, and a second storage unit.

The first judgment unit is configured to, when a B+ tree creation instruction is acquired, determine whether there is an idle underlying tree file mapped to a DRAM, if YES, trigger the first storage unit, or if NO, trigger the creation unit.

The first storage unit is configured to store underlying data of a B+ tree in the underlying tree file.

The creation unit is configured to create a new target underlying tree file, and map the target underlying tree file to the DRAM, so as to store the underlying data of the B+ tree in the target underlying tree file.

The second storage unit is configured to, when a number of layers of the B+ tree is greater than or equal to a preset threshold, store, in a preset storage area, data of a layer numbered to be greater than or equal to the preset threshold in the B+ tree.

In an embodiment, the B+ tree correspondingly includes a first layer, a second layer, and a third layer, and data of the first layer is determined as the underlying data.

Correspondingly, the second storage unit is specifically configured to store data of the second layer of the B+ tree in a DCPMM, and store data of the third layer of the B+ tree in a preset hard disk.

In a further embodiment, the apparatus further includes a determining-as unit.

The determining-as unit is configured to determine a minimum read/write granularity of the DCPMM as a node capacity of the B+ tree.

In a further embodiment, the first storage unit is specifically configured to store the underlying data of the B+ tree in the underlying tree file as each piece of node data according to the node capacity, wherein an offset address of a node of a next layer is stored in a key-value pair of the each piece of node data.

In a further embodiment, the apparatus further includes a query unit, a determination unit, and a reading unit.

The query unit is configured to, when a data query instruction is acquired, determine a root node according to a logical address contained in the data query instruction.

The determination unit is configured to determine a leaf node according to an offset address in the root node.

The reading unit is configured to read data corresponding to the leaf node.

In a further embodiment, the apparatus further includes a second judgment unit, a modification unit, a setting unit, a third judgment unit, and a reading unit.

The second judgment unit is configured to, when a data modification instruction is acquired, determine whether there is node data matched with a node identifier contained in the data modification instruction in the DRAM, if YES, trigger the modification unit, or if NO, trigger the third judgment unit.

The modification unit is configured to modify the node data according to surrogate data contained in the data modification instruction.

The setting unit is configured to set a dirty flag for modified node data.

The third judgment unit determines whether there is the node data matched with the node identifier contained in the data modification instruction in the DCPMM.

The modification unit is further configured to, when there is the node data matched with the node identifier contained in the data modification instruction in the DCPMM, modify the node data according to surrogate data contained in the data modification instruction.

The reading unit is configured to, when there is no node data matched with the node identifier contained in the data modification instruction in the DCPMM, read the node data matched with the node identifier contained in the data modification instruction from the hard disk to the DRAM.

The modification unit is further configured to complete, in the DRAM, modification of the node data according to surrogate data contained in the data modification instruction, and trigger the setting unit to set the dirty flag for modified node data.

In a further embodiment, the apparatus further includes a migration unit.

The migration unit is configured to migrate the data mapped to the DRAM and set with the dirty flag to the DCPMM according to preset periodic time.

The embodiments of the present disclosure also provide a B+ tree access apparatus, including:

a memory, configured to store a computer program; and a processor, configured to execute the computer program to implement any steps of the B+ tree access method as described above.

The embodiments of the present disclosure also provide a computer-readable storage medium, storing a computer program that is executed by a processor to implement any steps of the B+ tree access method as described above.

It can be seen from the above technical solutions that, when a B+ tree creation instruction is acquired, whether there is an idle underlying tree file mapped to a DRAM is determined. When there is the idle underlying tree file mapped to the DRAM, underlying data of a B+ tree may be directly stored in the underlying tree file. When there is no idle underlying tree file mapped to the DRAM, it is necessary to create a new target underlying tree file and map the target underlying tree file to the DRAM, so as to store the underlying data of the B+ tree in the target underlying tree file. When a number of layers of the B+ tree is greater than or equal to a preset threshold, data of a layer numbered to be greater than or equal to the preset threshold in the B+ tree is stored in a preset storage area. On the basis of a data structure of the B+ tree, data needs to be accessed from the underlying data whenever read, so the underlying data is accessed more. An underlying file is stored in the idle underlying tree file mapped to the DRAM, whereby the efficiency of accessing the underlying data is effectively improved. The other data in the B+ tree except the underlying data is accessed less, and in order to reduce the occupation of the DRAM, the other data may be stored in a storage space other than the DRAM. Therefore, the utilization rate of DRAM resources is increased, and the B+ tree read/write efficiency may also be ensured.

BRIEF DESCRIPTION OF THE DRAWINGS

In order to describe the embodiments of the present disclosure more clearly, the drawings required to be used in the embodiments will be introduced briefly below. Apparently, the drawings in the description below are only some embodiments of the present disclosure. Those ordinarily skilled in the art may further obtain other drawings according to these drawings without creative work.

DETAILED DESCRIPTION

The technical solutions in the embodiments of the present disclosure will be described clearly and completely below in combination with the drawings in the embodiments of the present disclosure. Clearly, the described embodiments are not all but only part of embodiments of the present disclosure. All other embodiments obtained by those ordinarily skilled in the art based on the embodiments in the present disclosure without creative work shall fall within the scope of protection of the present disclosure.

In order to make the solutions of the present disclosure understood better by those skilled in the art, the present disclosure will be further described below in detail in combination with the drawings and specific embodiments.

Figure 1:
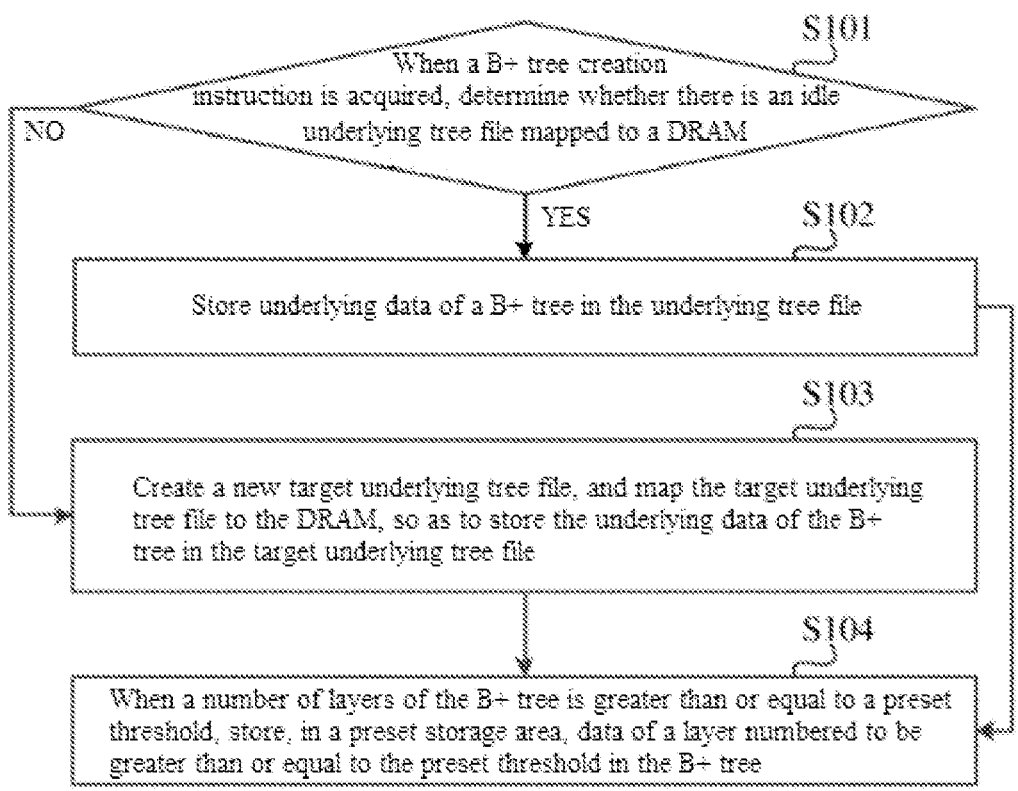
FIG. 1 is a flowchart of a B+ tree access method according to an embodiment of the present disclosure.

A B+ tree access method provided in the embodiments of the present disclosure is then introduced in detail. FIG. 1 is a flowchart of a B+ tree access method according to an embodiment of the present disclosure. The method includes the following steps.

In S101, when a B+ tree creation instruction is acquired, whether there is an idle underlying tree file mapped to a DRAM is determined.

When there is the idle underlying tree file mapped to the DRAM, it indicates that there is a file available for storing a B+ tree in the DRAM. In such case, S102 may be performed.

When there is no idle underlying tree file mapped to the DRAM, it indicates that there is no file for storing a B+ tree in the current DRAM. In such case, S103 may be performed.

In S102, underlying data of a B+ tree is stored in the underlying tree file.

In S103, a new target underlying tree file is created, and the target underlying tree file is mapped to the DRAM, so as to store the underlying data of the B+ tree in the target underlying tree file.

On the basis of a data structure of the B+ tree, data needs to be accessed from the underlying data whenever read, so the underlying data is accessed more frequently. An underlying file is stored in the idle underlying tree file mapped to the DRAM, whereby the efficiency of accessing the underlying data is effectively improved.

It is to be noted that, for ease of distinction, in the embodiment of the present disclosure, a newly created underlying tree file is referred to as a target underlying tree file. For a storage system, both the newly created target underlying tree file and the underlying tree file are files for storing the underlying data, and there are no substantial differences therebetween.

In S104, when a number of layers of the B+ tree is greater than or equal to a preset threshold, data of a layer numbered to be greater than or equal to the preset threshold in the B+ tree is stored in a preset storage area.

The B+ tree includes multiple layers of data. In the embodiment of the present disclosure, the data of the B+ tree may be divided into different layers, and frequencies and numbers of times of accessing the data of different layers are different. Therefore, the data of different layers may be stored at different positions.

In a specific implementation, the B+ tree may be divided into a first layer, a second layer, and a third layer. The data of the first layer is determined as the underlying data.

At the beginning of creation of the B+ tree, the underlying data is accessed more frequently. Therefore, in the embodiment of the present disclosure, the underlying data is stored in the idle underlying tree file mapped to the DRAM.

Considering that a DCPMM may implement direct data access without the DRAM in a Device Direct Access (DAX) mode, a DCPMM device in the Device DAX mode may be regarded as a DCPMM. In the embodiment of the present disclosure, data of the second layer of the B+ tree may be stored in a DCPMM.

In order to accurately control the use of the DCPMM and avoid DCPMM resources being wasted, data of the third layer of the B+ tree may be stored in a preset hard disk.

In practical applications, a first-layer file to a third-layer file of the B+ tree may be determined as the first layer, a fourth-layer file and a fifth-layer file may be determined as the second layer, and the data above a fifth-layer file may be determined as the third layer.

It can be seen from the above technical solutions that, when a B+ tree creation instruction is acquired, whether there is an idle underlying tree file mapped to a DRAM is determined. When there is the idle underlying tree file mapped to the DRAM, underlying data of a B+ tree may be directly stored in the underlying tree file. When there is no idle underlying tree file mapped to the DRAM, it is necessary to create a new target underlying tree file and map the target underlying tree file to the DRAM, so as to store the underlying data of the B+ tree in the target underlying tree file. When a number of layers of the B+ tree is greater than or equal to a preset threshold, data of a layer numbered to be greater than or equal to the preset threshold in the B+ tree is stored in a preset storage area. On the basis of a data structure of the B+ tree, data needs to be accessed from the underlying data whenever read, so the underlying data is accessed more. An underlying file is stored in the idle underlying tree file mapped to the DRAM, whereby the efficiency of accessing the underlying data is effectively improved. The other data in the B+ tree except the underlying data is accessed less, and in order to reduce the occupation of the DRAM, the other data may be stored in a storage space other than the DRAM. Therefore, the utilization rate of DRAM resources is increased, and the B+ tree read/write efficiency may also be ensured.

At the beginning of creation of the B+ tree, the underlying data is accessed more frequently, and thus may be stored in the DRAM. As storage time increases, the underlying data of the B+ tree is no longer accessed so frequently. In order to increase the utilization rate of the DRAM, during specific implementation, a dirty flag may be set for the underlying data stored in the DRAM, and then the underlying data stored in the DRAM may be migrated to the DCPMM periodically.

In order to improve the data read efficiency, during specific implementation, a minimum read/write granularity of the DCPMM may be determined as a node capacity of the B+ tree. An internal minimum read/write granularity of the DCPMM is 256 bytes, so a capacity of a B+ tree node may be set to 256 bytes, namely a set of check protection data is generated by every 256 bytes of data.

In the embodiment of the present disclosure, the underlying data of the B+ tree may be stored in the underlying tree file as each piece of node data according to the node capacity. An offset address of a node of a next layer is stored in a key-value pair of each piece of node data.

In practical applications, each node may include a 16-byte node header and at most 15 key-value pairs. The node header includes a node type and other information. The node type includes a leaf node and a non-leaf node. For a leaf node, a value in a key-value pair thereof is a RAID physical address, and specific data corresponding to the leaf node may be read according to the RAID physical address. For a non-leaf node, an offset address of a node of a next layer may be stored in a key-value pair thereof.

When a data query instruction is acquired, a root node may be determined according to a logical address contained in the data query instruction. A leaf node is determined according to an offset address in the root node. Data corresponding to the leaf node is read.

For example, when data of the B+ tree needs to be queried, a logical address of a data volume may be contained in a data query instruction. Metadata of the data volume may be found according to the logical address. If a memory address of a root node is protected in the metadata, an underlying tree file of the tree is in the memory. A leaf node may be searched according to an offset address stored in the corresponding node in the underlying tree file. If no leaf node is found till a third-layer node, an offset address of the corresponding node in a third-layer file is read from the metadata, thereby obtaining a storage address of a fourth-layer file. If this node is still a non-leaf node, a fifth-layer node continues to be accessed. If the fifth-layer node is still not a leaf node, the third-layer file is read into the memory to continue searching until a leaf node is found. Specific data corresponding to the leaf node may be read according to a RAID physical address stored in a key-value pair of the leaf node.

Figure 2:
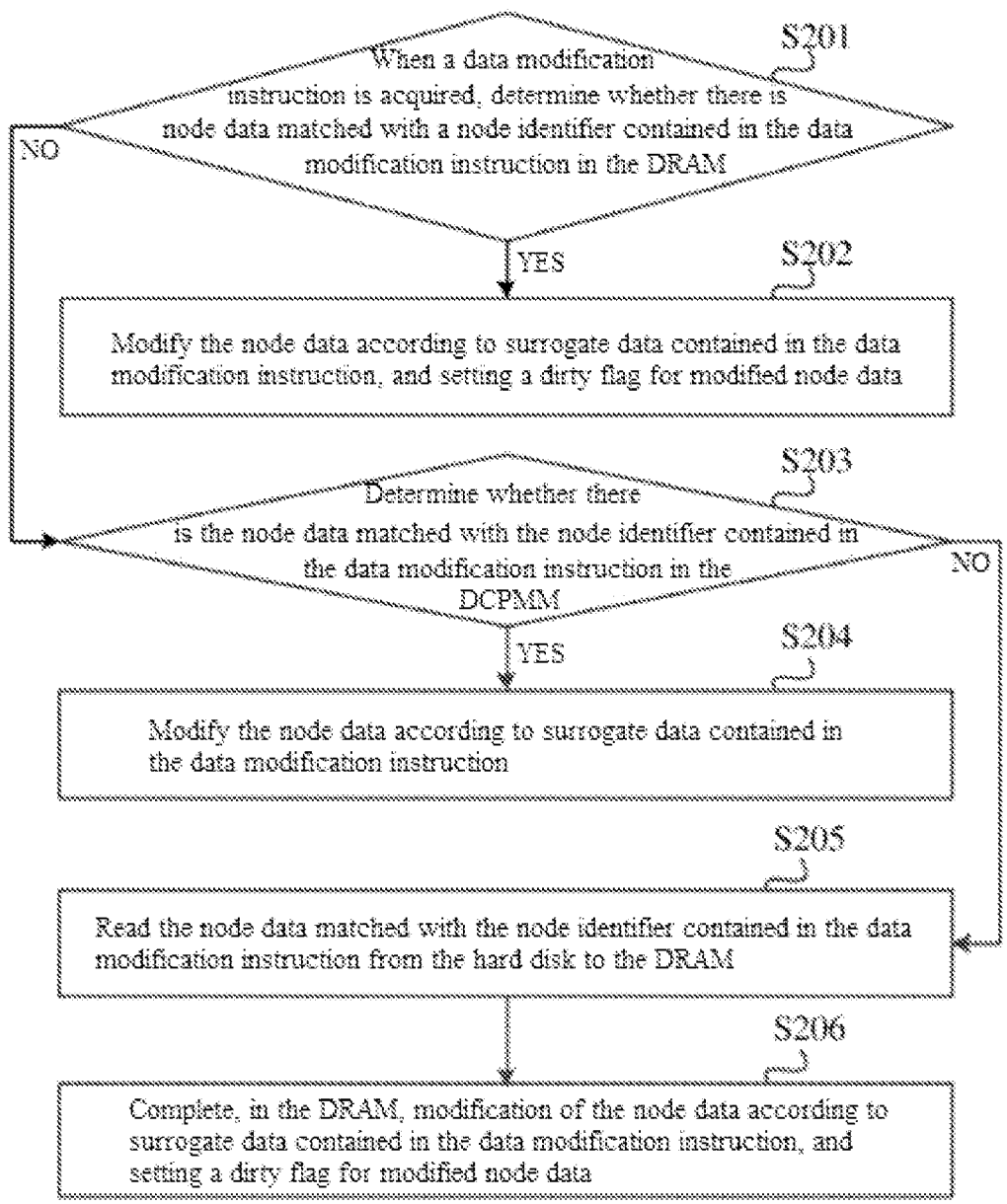
FIG. 2 is a flowchart of a B+ tree data modification method according to an embodiment of the present disclosure.

The data of the B+ tree is stored at different positions according to the divided layers. When data of the B+ tree needs to be modified, the storage position of the data that needs to be modified may be queried according to the storage positions, thereby implementing modification of the data in the B+ tree. FIG. 2 is a flowchart of a B+ tree data modification method according to an embodiment of the present disclosure, including the following steps.

In S201, when a data modification instruction is acquired, whether there is node data matched with a node identifier contained in the data modification instruction in the DRAM is determined.

When there is the node data matched with the node identifier contained in the data modification instruction in the DRAM, S202 is performed.

When there is no node data matched with the node identifier contained in the data modification instruction in the DRAM, it is necessary to further determine a position of the node data that needs to be modified. In such case, S203 may be performed.

In S202, the node data is modified according to surrogate data contained in the data modification instruction, and a dirty flag is set for modified node data.

Storing the node data in the DRAM may occupy DRAM resources. In order to increase the utilization rate of the DRAM resources, a dirty flag may be set for modified node data, and then the data mapped to the DRAM and set with the dirty flag may subsequently be migrated to the DCPMM according to preset periodic time.

In S203, whether there is the node data matched with the node identifier contained in the data modification instruction in the DCPMM is determined.

When there is the node data matched with the node identifier contained in the data modification instruction in the DCPMM, S204 is performed.

In the embodiment of the present disclosure, the data of the B+ tree may be stored in the DRAM, the DCPMM, and the preset hard disk respectively according to different layers. When there is no node data matched with the node identifier contained in the data modification instruction in the DRAM, and there is no node data matched with the node identifier contained in the data modification instruction in the DCPMM, it indicates that the node data that needs to be modified is stored in the preset hard disk. In such case, S205 may be performed.

In S204, the node data is modified according to surrogate data contained in the data modification instruction.

In S205, the node data matched with the node identifier contained in the data modification instruction is read from the hard disk to the DRAM.

Since data in the hard disk is not directly modifiable, when the node data that needs to be modified is stored in the preset hard disk, the node data matched with the node identifier contained in the data modification instruction needs to be read from the hard disk to the DRAM.

In S206, modification of the node data is completed in the DRAM according to surrogate data contained in the data modification instruction, and a dirty flag is set for modified node data.

When the node data that needs to be modified is stored in the DRAM or the hard disk, the modified node data may be stored in the DRAM. Since there are limited DRAM resources, to avoid the modified node data occupying the DRAM resources for long, in the embodiment of the present disclosure, a dirty flag may be set for the modified node data stored in the DRAM, and then the data mapped to the DRAM and set with the dirty flag may subsequently be migrated to the DCPMM according to preset periodic time.

The data stored in the DRAM is migrated periodically, whereby the long-term occupation of the DRAM resources by the data of the B+ tree is avoided, and the processing performance of the storage system is improved effectively.

Figure 3:
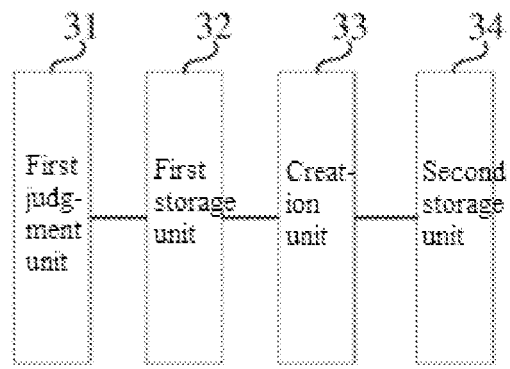
FIG. 3 is a schematic structural diagram of a B+ tree access apparatus according to an embodiment of the present disclosure.

FIG. 3 is a schematic structural diagram of a B+ tree access apparatus according to an embodiment of the present disclosure, including a first judgment unit 31, a first storage unit 32, a creation unit 33, and a second storage unit 34.

The first judgment unit 31 is configured to, when a B+ tree creation instruction is acquired, determine whether there is an idle underlying tree file mapped to a DRAM, if YES, trigger the first storage unit 32, or if NO, trigger the creation unit 33.

The first storage unit 32 is configured to store underlying data of a B+ tree in the underlying tree file.

The creation unit 33 is configured to create a new target underlying tree file, and map the target underlying tree file to the DRAM, so as to store the underlying data of the B+ tree in the target underlying tree file.

The second storage unit 34 is configured to, when a number of layers of the B+ tree is greater than or equal to a preset threshold, store, in a preset storage area, data of a layer numbered to be greater than or equal to the preset threshold in the B+ tree.

In a further embodiment, the B+ tree correspondingly includes a first layer, a second layer, and a third layer, and data of the first layer is determined as the underlying data.

Correspondingly, the second storage unit is specifically configured to store data of the second layer of the B+ tree in a DCPMM, and store data of the third layer of the B+ tree in a preset hard disk.

In a further embodiment, the apparatus further includes a determining-as unit.

The determining-as unit is configured to determine a minimum read/write granularity of the DCPMM as a node capacity of the B+ tree.

In a further embodiment, the first storage unit is specifically configured to store the underlying data of the B+ tree in the underlying tree file as each piece of node data according to the node capacity, wherein an offset address of a node of a next layer is stored in a key-value pair of each piece of node data.

In a further embodiment, the apparatus further includes a query unit, a determination unit, and a reading unit.

The query unit is configured to, when a data query instruction is acquired, determine a root node according to a logical address contained in the data query instruction.

The determination unit is configured to determine a leaf node according to an offset address in the root node.

The reading unit is configured to read data corresponding to the leaf node.

In a further embodiment, the apparatus further includes a second judgment unit, a modification unit, a setting unit, a third judgment unit, and a reading unit.

The second judgment unit is configured to, when a data modification instruction is acquired, determine whether there is node data matched with a node identifier contained in the data modification instruction in the DRAM, if YES, trigger the modification unit, or if NO, trigger the third judgment unit.

The modification unit is configured to modify the node data according to surrogate data contained in the data modification instruction.

The setting unit is configured to set a dirty flag for modified node data.

The third judgment unit determines whether there is the node data matched with the node identifier contained in the data modification instruction in the DCPMM.

The modification unit is further configured to, when there is the node data matched with the node identifier contained in the data modification instruction in the DCPMM, modify the node data according to surrogate data contained in the data modification instruction.

The reading unit is configured to, when there is no node data matched with the node identifier contained in the data modification instruction in the DCPMM, read the node data matched with the node identifier contained in the data modification instruction from the hard disk to the DRAM.

The modification unit is further configured to complete, in the DRAM, modification of the node data according to surrogate data contained in the data modification instruction, and trigger the setting unit to set a dirty flag for modified node data.

In a further embodiment, the apparatus further includes a migration unit.

The migration unit is configured to migrate the data mapped to the DRAM and set with the dirty flag to the DCPMM according to preset periodic time.

Descriptions about features in the embodiment corresponding to FIG. 3 may refer to the related descriptions in the embodiments corresponding to FIGS. 1 and 2. Elaborations are omitted herein.

It can be seen from the above technical solutions that, when a B+ tree creation instruction is acquired, whether there is an idle underlying tree file mapped to a DRAM is determined. When there is the idle underlying tree file mapped to the DRAM, underlying data of a B+ tree may be directly stored in the underlying tree file. When there is no idle underlying tree file mapped to the DRAM, it is necessary to create a new target underlying tree file and map the target underlying tree file to the DRAM, so as to store the underlying data of the B+ tree in the target underlying tree file. When a number of layers of the B+ tree is greater than or equal to a preset threshold, data of a layer numbered to be greater than or equal to the preset threshold in the B+ tree is stored in a preset storage area. On the basis of a data structure of the B+ tree, data needs to be accessed from the underlying data whenever read, so the underlying data is accessed more. An underlying file is stored in the idle underlying tree file mapped to the DRAM, whereby the efficiency of accessing the underlying data is effectively improved. The other data in the B+ tree except the underlying data is accessed less, and in order to reduce the occupation of the DRAM, the other data may be stored in a storage space other than the DRAM. Therefore, the utilization rate of DRAM resources is increased, and the B+ tree read/write efficiency may also be ensured.

Figure 4:
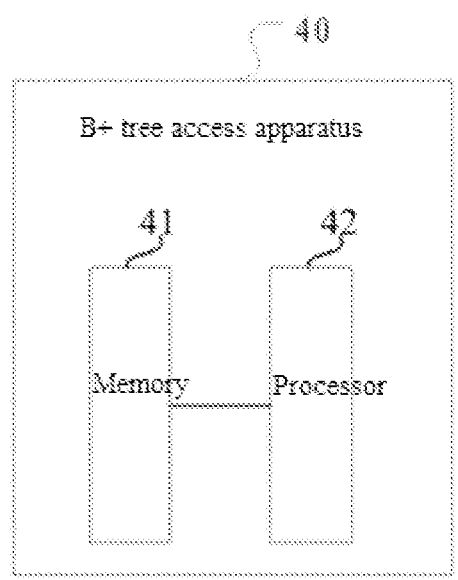
FIG. 4 is a schematic diagram of a hardware structure of a B+ tree access apparatus according to an embodiment of the present disclosure.

FIG. 4 is a schematic diagram of a hardware structure of a B+ tree access apparatus 40 according to an embodiment of the present disclosure, including:

a memory 41, configured to store a computer program; and a processor 42, configured to execute the computer program to implement any steps of the B+ tree access method as described in any one of the above-mentioned embodiments.

The embodiments of the present disclosure also provide a computer-readable storage medium, storing a computer program that is executed by a processor to implement any steps of the B+ tree access method as described in any one of the above-mentioned embodiments.

The B+ tree access method and apparatus and computer-readable storage medium provided in the embodiments of the present disclosure are introduced above in detail. Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method. It is to be pointed out that those ordinarily skilled in the art may further make a plurality of improvements and embellishments to the present disclosure without departing from the principle of the present disclosure, and these improvements and embellishments shall also fall within the scope of protection of the claims of the present disclosure.

Professionals may further realize that the units and algorithm steps of each example described in combination with the embodiments disclosed herein may be implemented by electronic hardware, computer software, or a combination thereof. In order to describe the interchangeability of hardware and software clearly, the compositions and steps of each example have been described generally in the foregoing descriptions according to functions. Whether these functions are executed by hardware or software depends on specific applications and design constraints of the technical solutions. Professionals may realize the described functions for each specific application by use of different methods, but such realization shall fall within the scope of the present disclosure.

The steps of the method or algorithm described in combination with the embodiments disclosed herein may directly be implemented by hardware, a software module executed by the processor, or a combination thereof. The software module may be arranged in a Random Access Memory (RAM), an internal memory, a Read-Only Memory (ROM), an electrically programmable ROM, an electrically erasable programmable ROM, a register, a hard disk, a removable disk, a Compact Disc Read-Only Memory (CD-ROM), or a storage medium in any other form well known in this art.

What is claimed is:

1. A B+ tree access method, comprising:
    acquiring a B+ tree creation instruction, and determining whether there is an idle underlying tree file mapped to a Dynamic Random Access Memory (DRAM);
    in response to there being the idle underlying tree file mapped to the DRAM, storing underlying data of a B+ tree in the underlying tree file;
    in response to there being no idle underlying tree file mapped to the DRAM, creating a new target underlying tree file, and mapping the target underlying tree file to the DRAM, so as to store the underlying data of the B+ tree in the target underlying tree file; and
    in response to a number of layers of the B+ tree being greater than or equal to a preset threshold, storing, in a preset storage area rather than the DRAM, data of a layer numbered to be greater than or equal to the preset threshold in the B+ tree.

2. The method according to claim 1, wherein the B+ tree correspondingly comprises a first layer, a second layer, and a third layer, and data of the first layer is determined as the underlying data; and
    correspondingly, in response to the number of layers of the B+ tree being greater than or equal to the preset threshold, storing, in a preset storage area, data of a layer numbered to be greater than or equal to the preset threshold in the B+ tree comprises:
    storing data of the second layer of the B+ tree in a Data Center Persistent Memory Module (DCPMM), and
    storing data of the third layer of the B+ tree in a preset hard disk.

3. The method according to claim 2, wherein the method further comprises:
    acquiring a data modification instruction, and determining whether there is node data matched with a node identifier contained in the data modification instruction in the DRAM;
    in response to there being the node data matched with the node identifier, modifying the node data according to surrogate data contained in the data modification instruction, and setting a dirty flag for modified node data;
    in response to there being no node data matched with the node identifier, determining whether there is the node data matched with the node identifier contained in the data modification instruction in the DCPMM;
    in response to there being the node data matched with the node identifier contained in the data modification instruction in the DCPMM, modifying the node data according to surrogate data contained in the data modification instruction;
    in response to there being no node data matched with the node identifier contained in the data modification instruction in the DCPMM, reading the node data matched with the node identifier contained in the data modification instruction from the hard disk to the DRAM; and completing, in the DRAM, modification of the node data according to surrogate data contained in the data modification instruction, and setting the dirty flag for modified node data.

4. The method according to claim 3, wherein after storing underlying data of the B+ tree in the underlying tree file, the method further comprises:
    migrating data mapped to the DRAM and set with the dirty flag to the DCPMM according to preset periodic time.

5. The method according to claim 1, wherein the method further comprises:
    determining a minimum read/write granularity of the DCPMM as a node capacity of the B+ tree.

6. The method according to claim 5, wherein the step of storing underlying data of the B+ tree in the underlying tree file comprises:
    storing the underlying data of the B+ tree in the underlying tree file as each piece of node data according to the node capacity, wherein an offset address of a node of a next layer is stored in a key-value pair of the each piece of node data.

7. The method according to claim 6, wherein the method further comprises:
    acquiring a data query instruction, and determining a root node according to a logical address contained in the data query instruction; and
    determining a leaf node according to an offset address in the root node, and reading data corresponding to the leaf node.

8. A B+ tree access apparatus, comprising:
    a memory, configured to store a computer program; and
    a processor, configured to execute the computer program, and upon execution of the computer program, is configured to:
    acquire a B+ tree creation instruction, and determine whether there is an idle underlying tree file mapped to a Dynamic Random Access Memory (DRAM);
    in response to there being the idle underlying tree file mapped to the DRAM, store underlying data of a B+ tree in the underlying tree file;
    in response to there being no idle underlying tree file mapped to the DRAM, create a new target underlying tree file, and map the target underlying tree file to the DRAM, so as to store the underlying data of the B+ tree in the target underlying tree file; and
    in response to a number of layers of the B+ tree being greater than or equal to a preset threshold, store, in a preset storage area rather than the DRAM, data of a layer numbered to be greater than or equal to the preset threshold in the B+ tree.

9. The B+ tree access apparatus according to claim 8, wherein the processor, upon execution of the computer program, in order to store, in the preset storage area, the data of the layer numbered to be greater than or equal to the preset threshold in the B+ tree, is configured to:
    store data of the second layer of the B+ tree in a Data Center Persistent Memory Module (DCPMM), and store data of the third layer of the B+ tree in a preset hard disk.

10. The B+ tree access apparatus according to claim 9, wherein the processor, upon execution of the computer program, is further configured to:
acquire a data modification instruction, and determine whether there is node data matched with a node identifier contained in the data modification instruction in the DRAM;
in response to there being the node data matched with the node identifier, modify the node data according to surrogate data contained in the data modification instruction, and set a dirty flag for modified node data;
in response to there being no node data matched with the node identifier, determine whether there is the node data matched with the node identifier contained in the data modification instruction in the DCPMM;
in response to there being the node data matched with the node identifier contained in the data modification instruction in the DCPMM, modify the node data according to surrogate data contained in the data modification instruction;
in response to there being no node data matched with the node identifier contained in the data modification instruction in the DCPMM, read the node data matched with the node identifier contained in the data modification instruction from the hard disk to the DRAM; and
complete, in the DRAM, modification of the node data according to surrogate data contained in the data modification instruction, and set the dirty flag for modified node data.

11. The B+ tree access apparatus according to claim 10, wherein the processor, upon execution of the computer program, is further configured to:
migrate data mapped to the DRAM and set with the dirty flag to the DCPMM according to preset periodic time.

12. The B+ tree access apparatus according to claim 8, wherein the processor, upon execution of the computer program, is further configured to:
determine a minimum read/write granularity of the DCPMM as a node capacity of the B+ tree.

13. The B+ tree access apparatus according to claim 12, wherein the processor, upon execution of the computer program, is further configured to:
store the underlying data of the B+ tree in the underlying tree file as each piece of node data according to the node capacity, wherein an offset address of a node of a next layer is stored in a key-value pair of the each piece of node data.

14. The B+ tree access apparatus according to claim 13, wherein the processor, upon execution of the computer program, is further configured to:
acquire a data query instruction, and determine a root node according to a logical address contained in the data query instruction; and
determine a leaf node according to an offset address in the root node, and read data corresponding to the leaf node.

15. A non-transitory computer-readable storage medium, storing a computer program that is executable by a processor, and upon execution by the processor, is configured to cause the processor to:
acquire a B+ tree creation instruction, and determine whether there is an idle underlying tree file mapped to a Dynamic Random Access Memory (DRAM);
in response to there being the idle underlying tree file mapped to the DRAM, store underlying data of a B+ tree in the underlying tree file;
in response to there being no idle underlying tree file mapped to the DRAM, create a new target underlying tree file, and map the target underlying tree file to the DRAM, so as to store the underlying data of the B+ tree in the target underlying tree file; and
in response to a number of layers of the B+ tree being greater than or equal to a preset threshold, store, in a preset storage area rather than the DRAM, data of a layer numbered to be greater than or equal to the preset threshold in the B+ tree.

16. The non-transitory computer-readable storage medium according to claim 15, wherein the computer program, upon execution by the processor, in order to cause the processor to store, in the preset storage area, the data of the layer numbered to be greater than or equal to the preset threshold in the B+ tree, is configured to cause the processor to:
store data of the second layer of the B+ tree in a Data Center Persistent Memory Module (DCPMM), and
store data of the third layer of the B+ tree in a preset hard disk.

17. The non-transitory computer-readable storage medium according to claim 16, wherein the computer program, upon execution by the processor, is further configured to cause the processor to:
acquire a data modification instruction, and determine whether there is node data matched with a node identifier contained in the data modification instruction in the DRAM;
in response to there being the node data matched with the node identifier, modify the node data according to surrogate data contained in the data modification instruction, and set a dirty flag for modified node data;
in response to there being no node data matched with the node identifier, determine whether there is the node data matched with the node identifier contained in the data modification instruction in the DCPMM;
in response to there being the node data matched with the node identifier contained in the data modification instruction in the DCPMM, modify the node data according to surrogate data contained in the data modification instruction;
in response to there being no node data matched with the node identifier contained in the data modification instruction in the DCPMM, read the node data matched with the node identifier contained in the data modification instruction from the hard disk to the DRAM; and
complete, in the DRAM, modification of the node data according to surrogate data contained in the data modification instruction, and set the dirty flag for modified node data.

18. The non-transitory computer-readable storage medium according to claim 10, wherein the computer program, upon execution by the processor, is further configured to cause the processor to:
determine a minimum read/write granularity of the DCPMM as a node capacity of the B+ tree.

19. The non-transitory computer-readable storage medium according to claim 18, wherein the computer program, upon execution by the processor, is further configured to cause the processor to:
store the underlying data of the B+ tree in the underlying tree file as each piece of node data according to the node capacity, wherein an offset address of a node of a next layer is stored in a key-value pair of the each piece of node data.

20. The non-transitory computer-readable storage medium according to claim 19, wherein the computer program, upon execution by the processor, is further configured to cause the processor to:
   acquire a data query instruction, and determine a root node according to a logical address contained in the data query instruction; and
   determine a leaf node according to an offset address in the root node, and read data corresponding to the leaf node.

* * * * *